(12) United States Patent
Summerlin et al.

(10) Patent No.: US 7,933,765 B2
(45) Date of Patent: Apr. 26, 2011

(54) CROSS-LINGUAL INFORMATION RETRIEVAL

(75) Inventors: Joel Summerlin, Seattle, WA (US); Jarett Funnell, Everett, WA (US); Heike Uhlig, Seattle, WA (US); Wayne Yerigan, Stanwood, WA (US)

(73) Assignee: Corbis Corporation, Seattle, WA (US)

( * ) Notice: Subject to any disclaimer, the term of this patent is extended or adjusted under 35 U.S.C. 154(b) by 1035 days.

(21) Appl. No.: 11/692,777

(22) Filed: Mar. 28, 2007

(65) Prior Publication Data
US 2008/0275691 A1    Nov. 6, 2008

Related U.S. Application Data

(60) Provisional application No. 60/886,649, filed on Jan. 25, 2007.

(51) Int. Cl.
*G06F 17/20* (2006.01)
(52) U.S. Cl. .......................................................... 704/8
(58) Field of Classification Search .................. 704/2–4, 704/7–8, 10; 707/705–706, 760
See application file for complete search history.

(56) References Cited

U.S. PATENT DOCUMENTS

| | | |
|---|---|---|
| 4,337,483 A | 6/1982 | Guillou et al. |
| 5,201,047 A | 4/1993 | Maki et al. |
| 5,241,671 A | 8/1993 | Reed et al. |
| 5,251,316 A | 10/1993 | Anick et al. |
| 5,260,999 A | 11/1993 | Wyman |
| 5,263,158 A | 11/1993 | Janis |
| 5,317,507 A | 5/1994 | Gallant |
| 5,319,705 A | 6/1994 | Halter et al. |
| 5,325,298 A | 6/1994 | Gallant |
| 5,438,508 A | 8/1995 | Wyman |
| 5,442,778 A | 8/1995 | Pedersen et al. |
| 5,493,677 A | 2/1996 | Balogh et al. |

(Continued)

FOREIGN PATENT DOCUMENTS

WO    WO-02/19147    3/2002

OTHER PUBLICATIONS

Kishida. "Technical issues of cross-language information retrieval: a review. Information Processing and Management", 41(3), Jan. 2005, pp. 433-455.*

(Continued)

*Primary Examiner* — Susan McFadden
(74) *Attorney, Agent, or Firm* — Frommer Lawrence & Haug LLP; John W. Branch

(57) ABSTRACT

Multi-lingual search and retrieval of digital content. Embodiments are generally directed to methods and systems for creating an English language database that associates non-English terms with English terms in multiple categories of metadata. Language experts use an interface to create equivalencies between non-English terms and English terms, Boolean expressions, synonyms, and other forms of search terms. Language dictionaries and other sources also create equivalencies. The database is used to evaluate non-English search terms submitted by a user, and to determine English search terms that can be used to perform a search for content. The multiple categories of metadata may comprise structured data, such as keywords of a structured vocabulary, and/or unstructured data, such as captions, titles, descriptions, etc. Weighting and/or prioritization can be applied to the search terms, to the process of searching the multiple categories, and/or to the search results, to rank the search results.

29 Claims, 10 Drawing Sheets

U.S. PATENT DOCUMENTS

| | | | |
|---|---|---|---|
| 5,519,608 A * | 5/1996 | Kupiec | 704/9 |
| 5,532,839 A | 7/1996 | Beikirch et al. | |
| 5,553,143 A | 9/1996 | Ross et al. | |
| 5,600,775 A | 2/1997 | King et al. | |
| 5,629,980 A | 5/1997 | Stefik et al. | |
| 5,642,502 A | 6/1997 | Driscoll | |
| 5,675,819 A | 10/1997 | Schuetze | |
| 5,682,487 A | 10/1997 | Thomson | |
| 5,706,497 A | 1/1998 | Takahashi et al. | |
| 5,721,902 A | 2/1998 | Schultz | |
| 5,758,257 A | 5/1998 | Herz et al. | |
| 5,765,152 A | 6/1998 | Erickson | |
| 5,778,362 A | 7/1998 | Deerwester et al. | |
| 5,794,249 A | 8/1998 | Orsolini et al. | |
| 5,813,014 A | 9/1998 | Gustman | |
| 5,832,495 A | 11/1998 | Gustman | |
| 5,832,499 A | 11/1998 | Gustman | |
| 5,850,561 A | 12/1998 | Church et al. | |
| 5,864,845 A | 1/1999 | Voorhees et al. | |
| 5,875,446 A | 2/1999 | Brown et al. | |
| 5,903,892 A | 5/1999 | Hoffert et al. | |
| 5,938,724 A | 8/1999 | Pommier et al. | |
| 5,987,459 A | 11/1999 | Swanson et al. | |
| 6,006,221 A | 12/1999 | Liddy et al. | |
| 6,006,241 A | 12/1999 | Purnaveja et al. | |
| 6,012,068 A | 1/2000 | Boezeman et al. | |
| 6,038,333 A | 3/2000 | Wang | |
| 6,072,904 A | 6/2000 | Desai et al. | |
| 6,125,236 A | 9/2000 | Nagaraj et al. | |
| 6,138,119 A | 10/2000 | Hall et al. | |
| 6,243,713 B1 | 6/2001 | Nelson et al. | |
| 6,349,373 B2 | 2/2002 | Sitka et al. | |
| 6,385,596 B1 | 5/2002 | Wiser et al. | |
| 6,404,441 B1 | 6/2002 | Chailleux | |
| 6,523,028 B1 | 2/2003 | DiDomizio et al. | |
| 6,546,405 B2 | 4/2003 | Gupta et al. | |
| 6,574,609 B1 | 6/2003 | Downs et al. | |
| 6,574,622 B1 | 6/2003 | Miyauchi et al. | |
| 6,578,072 B2 | 6/2003 | Watanabe et al. | |
| 6,578,073 B1 | 6/2003 | Starnes et al. | |
| 6,581,055 B1 | 6/2003 | Ziauddin et al. | |
| 6,618,808 B1 | 9/2003 | Johnson et al. | |
| 6,735,583 B1 | 5/2004 | Bjarnestam et al. | |
| 6,834,130 B1 | 12/2004 | Niikawa et al. | |
| 6,868,192 B2 | 3/2005 | Takiguchi | |
| 6,871,009 B1 | 3/2005 | Suzuki | |
| 6,920,610 B1 | 7/2005 | Lawton et al. | |
| 6,931,408 B2 * | 8/2005 | Adams et al. | 1/1 |
| 6,944,340 B1 | 9/2005 | Shah | |
| 6,947,959 B1 | 9/2005 | Gill | |
| 7,110,937 B1 * | 9/2006 | Lei et al. | 704/2 |
| 7,277,884 B2 * | 10/2007 | Vadai et al. | 1/1 |
| 7,454,413 B2 * | 11/2008 | Lakshminarayanan et al. | 1/1 |
| 7,603,353 B2 * | 10/2009 | Knepper et al. | 1/1 |
| 2002/0000998 A1 | 1/2002 | Scott et al. | |
| 2002/0077986 A1 | 6/2002 | Kobata et al. | |
| 2002/0082997 A1 | 6/2002 | Kobata et al. | |
| 2003/0085997 A1 | 5/2003 | Takagi et al. | |
| 2004/0205333 A1 | 10/2004 | Bjorkengren | |
| 2005/0114329 A1 * | 5/2005 | Dettinger et al. | 707/5 |
| 2005/0177358 A1 | 8/2005 | Melomed et al. | |
| 2005/0203931 A1 | 9/2005 | Pingree et al. | |
| 2006/0059192 A1 | 3/2006 | Chun et al. | |
| 2006/0242139 A1 | 10/2006 | Butterfield et al. | |
| 2006/0277189 A1 * | 12/2006 | Cencini | 707/10 |

OTHER PUBLICATIONS

Kraaij et al. "Embedding Web-based Statistical Transition Models in Cross-Language Information Retrieval", Computational Linguistics 29(3), 2003, pp. 381-419.*

Harman et al., "Inverted Files," Information Retrieval: Data Structures & Algorithms, Prentice Hall PTR, 1992, pp. 28-43.

Salton, Gerard et al., "Introduction to Modern Information Retrieval," McGraw-Hill, Inc., 1983, 14 pgs.

Vellucci, Sherry L. "Metadata," Annual Review of Information Science and Technology, 1998, vol. 33, pp. 187-222.

Wool, Gregory "A Meditation on Metadata," E-Serials: Publishers, Libraries, Users and Standards, 1998, 10 pgs.

Getty Images, License Information located at<http://creative.gettyimages.com/source/home/license.aspx>, visited Jul. 6, 2006, Copyright 1999-2006, 2 pgs.

New Services Simplify Online Reprint Requests by Organization and Individuals; Agreement Marks 1st Content-Licensing Arrangement for UPI, Feb. 3, 2004, St. Paul, Minnesota, 3 pgs., http://www.icopyright.com/news/pr20040203.html, accessed May 8, 2004.

Rada, Roy "Hypertext Writing and Document Reuse: The Role of a Semantic Net," Electronic Publishing, Aug. 1990, vol. 3(3), pp. 125-140.

New Services Simplify Online Reprint Requests by Organizations and Individuals; Agreement Marks 1st Content-Licensing Arrangement for UPI, Feb. 3, 2004, St. Paul, Minnesota, 3 pgs., http://www.icopyright.com/news/pr20040203.html, accessed May 8, 2004.

Media & Digital Asset Mangement v2.5, IntegritSistem, 3 pgs., http://www.integritsistem.com/mam/index.htm, accessed Aug. 3, 2004.

"Final Cut Pro HD gives you powerful, intuitive content management tools that let you consolidate, relink, mark and store your digital assets for quick retrieval," Apple Computer, Inc., 2 pgs., http://www.apple.com/finalcutpro/content.html, accessed Aug. 3, 2004.

"What is a CareyDAM?," 2 pgs., http://www.dambigidea.com/indexinstantinfo.html, accessed Aug. 3, 2004.

"DSMCi Chosen to be Lead Integrator for Discovery Communication's/Discovery Images' Digital Media Management System," DSMCi, Aug. 6, 1998, Beltsville, Maryland, 3 pgs., http://www.dsmci.com/press_080698_discovery.html, accessed Aug. 3, 2004.

Rada, Roy "Hypertext Writing and Document Reuse: The Role of a Semantic Net," Electronic Publishing, Aug. 1990, vol. 3(3), pp. 125-140.

Lohner, Joe "Machine Conceptualization of Natural Language Text," A Thesis Submitted to the Division of Research and Advanced Studies of the University of Cincinnati, 1995, pp. 1-315.

Zamir, Oren et al., "Fast and Intuitive Clustering of Web Documents," Department of Computer Science and Engineering, University of Washington, Seattle, Washington, 1997, pp. 1-8.

* cited by examiner

| Language | Search Query | Compound Equivalent |
|---|---|---|
| German | Badmintonspielerin | Badminton player AND ( female OR Woman ) |
| German | Badmintonspielerinnen | Badminton player AND ( female OR Woman ) |
| German | Bahrtunnel | ( track's OR train ) AND tunnel |
| German | Delinquentin | Criminals AND ( female OR Woman ) |
| German | Delinquentinnen | Criminals AND ( female OR Woman ) |
| German | Eisenbahntunnel | ( tracks OR train ) AND tunnel |
| German | Garantie | insurance AND safety |
| German | hinterkoepfe | head AND from behind |
| German | hinterKopf | head AND from behind |
| German | Höhlentaucherin | Cave diving AND ( female OR Woman ) |
| German | Höhlentaucherinnen | Cave diving AND ( female OR Woman ) |
| German | Mountainbikefahrerin | Mountain biking AND ( female OR Woman ) |
| German | Mountainbikefahrerinnen | Mountain biking AND ( female OR Woman ) |
| German | Mountainbikerin | Mountain biking AND ( female OR Woman ) |
| German | Mountainbikerinnen | Mountain biking AND ( female OR Woman ) |
| German | Sprinterin | Sprinter AND ( female OR Woman ) |
| German | Sprinterinnen | Sprinter AND ( female OR Woman ) |
| German | Versicherungsagentin | Insurance agent AND ( female OR Woman ) |
| German | Versicherungsagentinnen | Insurance agent AND ( female OR Woman ) |
| German | winterlandschaft | ( TDS:Winter AND PICT:Landscape ) OR ( winter AND landscape ) |
| German | winterlandschaften | ( TDS:Winter AND PICT:Landscape ) OR ( winter AND landscape ) |
| German | Zentimeterband | Measuring tape AND centimeter |
| German | Zentimetermaß | Measuring tape AND centimeter |
| German | Zentimetermaßband | Measuring tape AND centimeter |

FIG. 8

CROSS-LINGUAL INFORMATION RETRIEVAL

CROSS-REFERENCE TO RELATED APPLICATIONS

This application claims the benefit of U.S. Provisional Patent Application 60/886,649 filed Jan. 25, 2007; the contents of which are hereby incorporated by reference.

FIELD OF ART

The invention is directed to the management of content, and more particularly, to multi-lingual search and retrieval for catalogued archives of digital content.

BACKGROUND

A content management system, such as a Digital Asset Management system (DAM) is often employed to enable multiple users to store, search, and access content that is owned or licensed by an organization. This content is generally provided as one or more media objects in a digital format, such as pictures, text, videos, graphics, illustrations, images, audio files, fonts, colors, and the like. To make content globally available, it is desirable for users to search for content using a desired language. To accommodate multiple languages, a searching system may use multiple search indices, such as one search index for each language. It is generally time consuming and expensive to create and maintain indices in multiple languages.

In addition, it is desirable to include multiple categories of metadata about the content that may be searched. Some search systems use only keywords. Such keywords may comprise a controlled vocabulary that uniquely identifies each keyword, and distinguishes meanings when a keyword has multiple meanings. Keywords illustrate an example of structured metadata. However, it is desirable to also enable searching of other categories of metadata, such as captions, titles, paragraphs, date, context, and/or other categories of metadata that may be known about content beyond just keywords. Such categories are sometimes referred to as unstructured metadata. Further, it is desirable to enable searching of all categories in multiple languages. However, creating and maintaining multiple language indices that include multiple categories is generally more time consuming and expensive than a single language index.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

FIG. 8 shows a sample user interface for specifying that a non-English term is equivalent to a Boolean expression of English terms, in accordance with an embodiment of the present invention;

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be implemented in different embodiments as methods, processes, processor readable mediums, systems, business methods, or devices. Accordingly, the present invention may take the form of an entirely hardware embodiment, an entirely software embodiment or an embodiment combining software and hardware aspects. The following detailed description is, therefore, not to be taken in a limiting sense.

Briefly, the present invention relates to multi-lingual search and retrieval for catalogued archives of digital content. The following example embodiments are generally described in terms of a multi-lingual system that uses English as a primary language. Accordingly, these embodiments generally describe creating an English language database that associates non-English terms with English terms. These embodiments also generally describe methods and systems for evaluating non-English search terms submitted by a user, to determine English search terms that can be used to perform a search for content. Multiple categories of metadata may be searched, including structured and unstructured metadata. Submitted query terms, translated English query terms, structured metadata, unstructured metadata, search content, and/or search results, can be weighted or prioritized. For example, the English language query terms themselves can be weighted based on pre-defined priorities. In addition, or alternatively, a match found with structured metadata, such as a keyword, may be given more weight than a match found with unstructured data, such as a caption.

Figure 1:
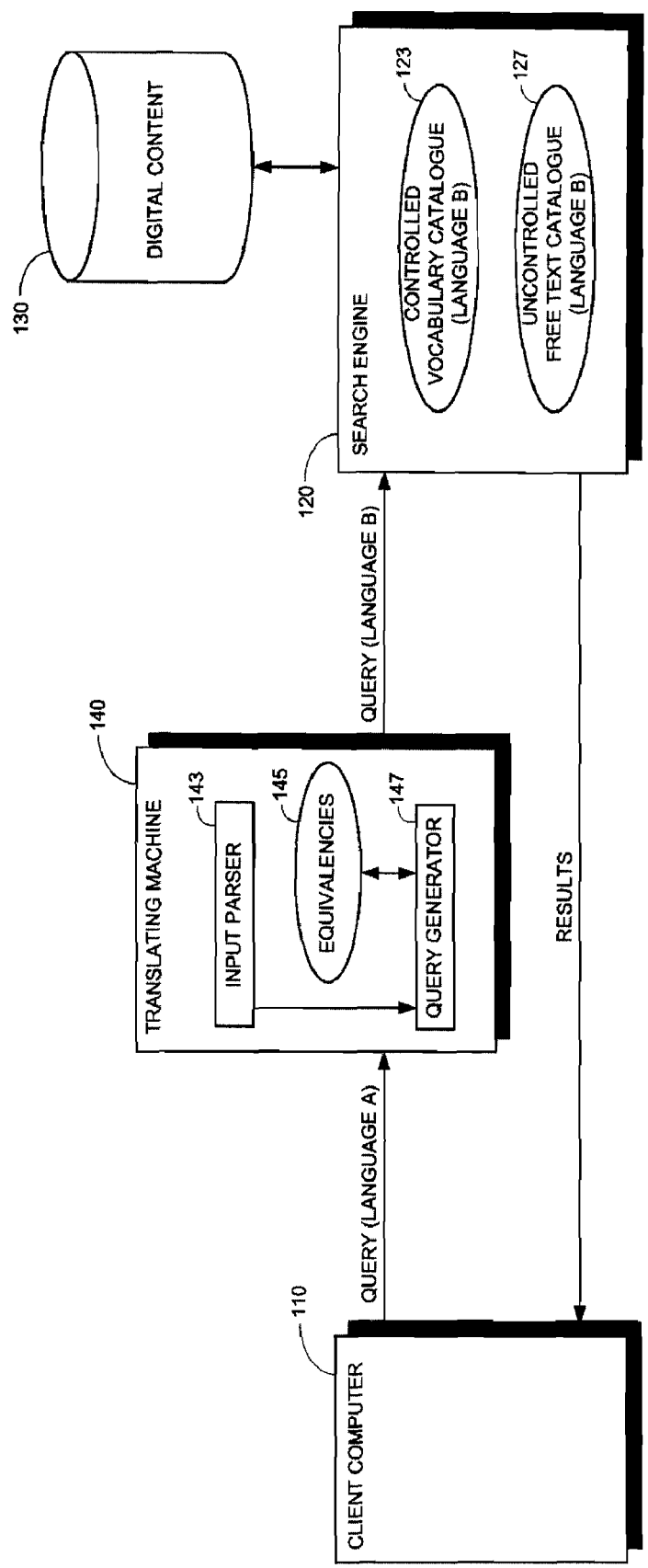
FIG. 1 is a simplified block diagram of an overall multi-lingual search and retrieval system, in accordance with an embodiment of the present invention.

Reference is now made to FIG. 1, which is a simplified block diagram of an overall multi-lingual search and retrieval system, in accordance with an embodiment of the present invention. Assets in digital archives, such as documents, music, pictures and video, are often catalogued by keywords and may also be associated with other textual descriptions such as captions, headings and titles. Some of this metadata may be structured and precise, such as keywords from a controlled vocabulary; other metadata in the same archive may be unstructured, such as free-text captions and titles. The present invention enables search and retrieval of such catalogued content using multi-lingual search queries, even when all of the underlying metadata is in a single language. The scope of languages supported by the present invention is unlimited, and includes inter alia Roman, Asiatic and Cyrillic based languages.

An embodiment of a multi-lingual search and retrieval system generally includes a content catalogue and a translation machine.

In accordance with the present invention, a cataloguing system may include both controlled and uncontrolled metadata. Keywords from a controlled vocabulary have precise meanings, and are represented by unique identifiers. Each controlled term is thus unique within metadata, and represents a precise concept. In one embodiment of the present invention, controlled vocabulary terms are identified by unique IDs.

In another embodiment of the present invention, referenced in the ensuing description, controlled vocabulary terms are uniquely identified by "tag-term" pairings, where the "tag" indicates a context and the term indicates the specific keyword. Thus, the tag-term pair GAN:Turkey, for example, has a tag "GAN" indicating a Generic Animal Name, and a term "Turkey". It will be appreciated by those skilled in the art that the same term may appear with different tags, since the same term may have multiple contexts. Thus, a completely different "tag-term" pairing would be used to refer to "Turkey" as a country. In uncontrolled free-text metadata, such as titles and captions, the word "turkey" could also appear, but would lack the contextual information found in a controlled vocabulary. Contextual information and/or other meaning limitations can be identified by other unique identifiers, such as numerical codes, flags, pointers, and the like.

Controlled vocabularies also support maintenance of synonyms; i.e., different terms with the same or similar meanings. When synonymous terms exist, one of them is designated as the Preferred term and the others are designated as similar terms, sometimes known as "lead-ins".

Metadata in a cataloguing system may exist in one or more languages and queries may be formulated in one or more languages. For the sake of clarification and definitiveness, FIG. 1 illustrates a search query in Language A and cataloguing system in Language B.

In accordance with the present invention, a translation system dynamically translates queries with text expressed in a first language, say, Language A, into queries with text expressed in a second language, say, Language B, based on a list of language equivalencies. Generally, language associations are complex, and not simply one-to-one. That is, a term in Language A may have multiple equivalents or similar terms in Language B, or it may not have any equivalents. In some cases, a term in Language A can be expressed in Language B only through a combination of words and phrases. In order to accommodate these and other complexities, the list of language equivalencies is flexible enough to handle a variety of linguistic situations, including compound expressions, as described in detail herein below. As used herein, the term "equivalent" generally means an associated term or terms in another language. The associated term or terms may or may not have an identical definition as the original term.

Referring to FIG. 1, a user of a client computer 110 submits a query in Language A to a search engine 120, requesting content from a digital content data store 130. The content in data store 130 is indexed in a controlled vocabulary catalogue 123, a free text catalogue 127, or both, but these catalogues are expressed in Language B. Search engine 120 operates by accepting input in the form of a query expressed in Language B and produces output in the form of content, or references to content, in data store 130 that correspond to the input query. As such, the query issued by client computer 110 in Language A cannot be directly matched against the catalogues 123 and 127.

To this end, a translation machine 140 mediates between client computer 110 and search engine 120. Translation machine 140 accepts as input a query expressed by the user in Language A and, using a parser, 143, a list of equivalencies 145 and a query generator 147, produces as output a corresponding query expressed in Language B. Parser 143 accepts as input a query expressed in Language A and produces as output individual terms and expressions from the input query. Although parser 143 is illustrated as parsing queries expressed in Language A, and the list of equivalencies 145 is illustrated as storing equivalent terms from Language A and Language B, in general parser 143 is used to parse multiple languages, and the list of equivalencies 145 stores many language equivalencies. It will be appreciated by those skilled in the art that query generator 147 may also re-format the user's query to conform to a standard query language such as SQL. The query output by translation machine 140 is suitable as input for search engine 120. Search results may be returned in Language B or may be processed in a similar manner to provide at least some of the results data in Language A.

To further clarify the description of the examples below, Language A, the user's query language, will be referred to henceforth as a non-English language (more precisely, a non-US-English language), and Language B, the catalogue language, will be referred to henceforth as the English language (more precisely, the US-English language).

Figure 2:
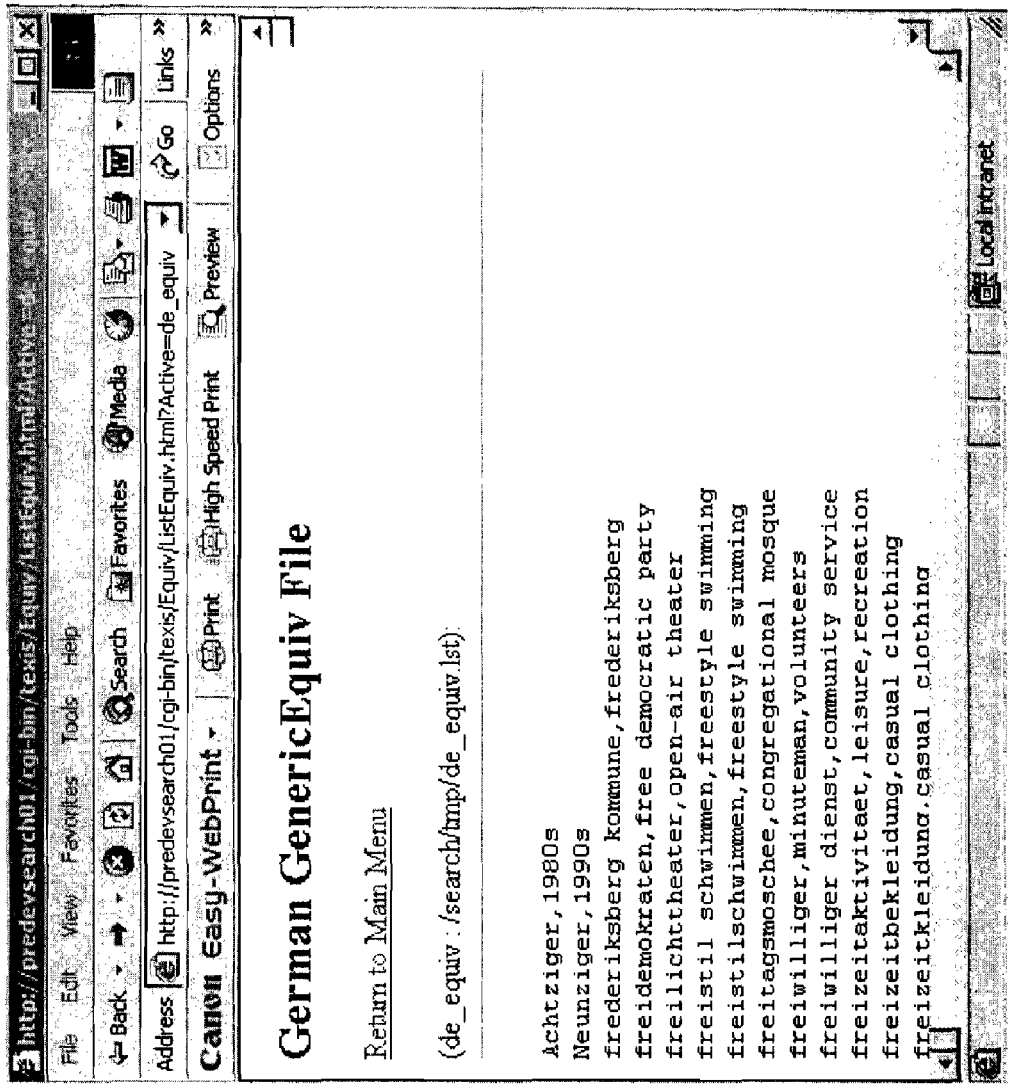
FIG. 2 shows a portion of a German-->English list of equivalencies, in accordance with an embodiment of the present invention.

Reference is now made to FIG. 2, which shows a portion of a German-->English list of equivalencies, in accordance with an embodiment of the present invention. For each German term, the list includes one or more English equivalents. The English equivalents may correspond to unique controlled vocabulary terms, or may simply be free-text. The list includes equivalencies where a single German term has multiple English equivalents; for example, the German term "freizeitaktivitaet" is equivalent both to the English term "leisure" and to the English term "recreation". In accordance with an embodiment of the present invention, each entry in the list is formatted as:

German word, English equivalent #1, . . . , English equivalent #n with commas separating the various English equivalents.

It will be appreciated by those skilled in the art that an English equivalent term may be ambiguous in its meaning. For example, a search for the French term "dinde" would be translated into English as "turkey". Since "dinde" refers only to the bird, and not to the country, it is desirable to limit the English equivalent to the controlled vocabulary term; namely, GAN:Turkey. Otherwise, the results retrieved may include irrelevant items. Equivalencies may therefore be limited to unique controlled values only, such as the unique "tag-term" combination. For non-ambiguous terms, the equivalency may include both the controlled value and its free-text equivalent. For example, the Spanish term "caballo" may be listed as being equivalent to "GAN:Horse", or equivalent to "horse", or equivalent to both forms. A search for digital content corresponding to GAN:Horse; namely, only those items associated with that controlled keyword, is narrower than a search for digital content corresponding to "horse"; i.e., those terms with the word "horse" mentioned anywhere in controlled or uncontrolled metadata. Depending on the meaning of the non-English term, either form, or both, may be appropriate.

Figure 3:
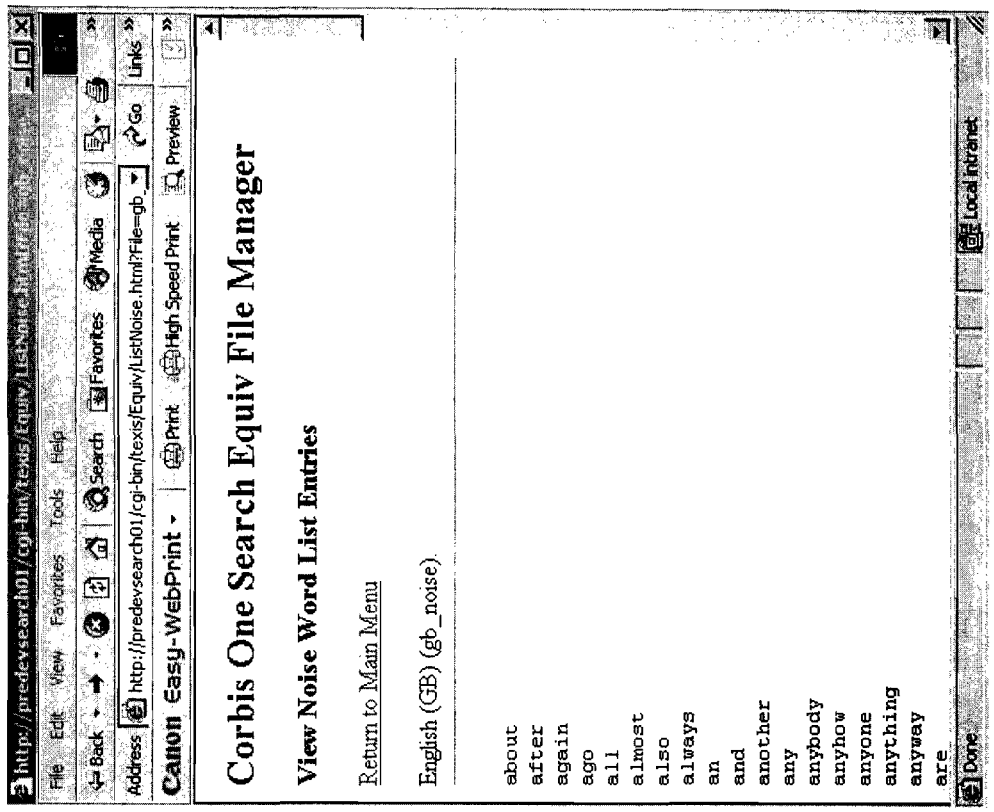
FIG. 3 shows a portion of a list of English noise words, in accordance with an embodiment of the present invention.

Often words appear in queries that are less significant than other words, and may be dropped from a user's search query in order to improve the search results. Such words are referred to herein as "noise words". Reference is now made to FIG. 3, which shows a portion of a list of English noise words, in accordance with an embodiment of the present invention.

Figure 4:
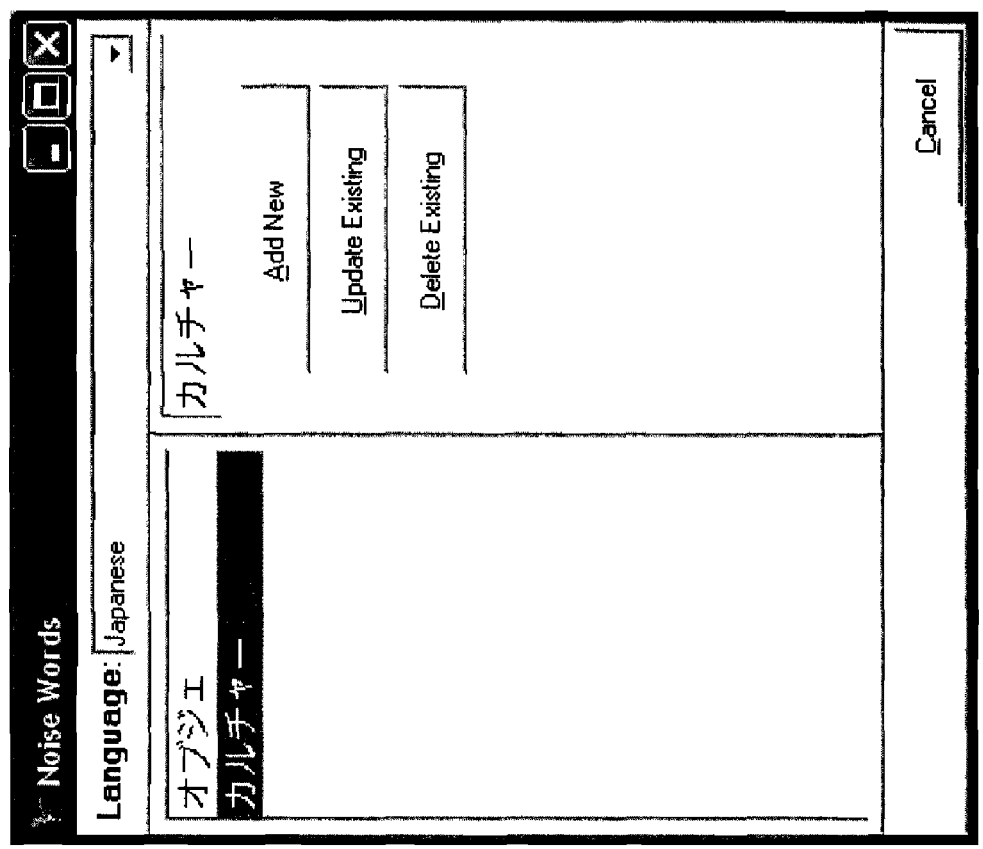
FIG. 4 shows a sample user interface for specifying and managing a list of noise words, in accordance with an embodiment of the present invention.

Reference is now made to FIG. 4, which shows a sample user interface for specifying and managing a list of Japanese noise words, in accordance with an embodiment of the present invention.

When parser 143 of FIG. 1 encounters noise words, it flags them for conditional removal. If the flagged words are not being used within the input query as part of a longer multi-word expression, then they are dropped so that the output query of translation machine 140 does not include English noise word equivalents thereof. Specifically, if a flagged word appears within a query as part of a non-English multi-word expression, then the non-English multi-word is translated into English. Otherwise, if the flagged word does not appear as part of such a non-English multi-word, then it is dropped. For example, the French word "de", meaning "of", is a noise word. However, the word "de" appears within the French multi-word "pomme de terre", which has an equivalency entry pomme de terre=potato If a French query includes the word "de" as part of the multi-word "pomme de terre", then this multi-word is translated into the English "potato". Otherwise, if the French query includes the word "de" but not as part of a multi-word, then the word "de" is dropped by translation machine 140.

It may be appreciated from FIG. 1 that the multi-lingual system of FIG. 1 utilizes the information stored in catalogues 123 and 127, and in the list of equivalencies 145; and that the tasks of generating catalogues 123 and 127, and of generating the list of equivalencies 145, may be formidable tasks. Embodiments of the present invention include a tool, the user interface of which is illustrated below in FIG. 6, used by vocabulary experts to specify and manage the list of equivalencies 145.

Figure 5:
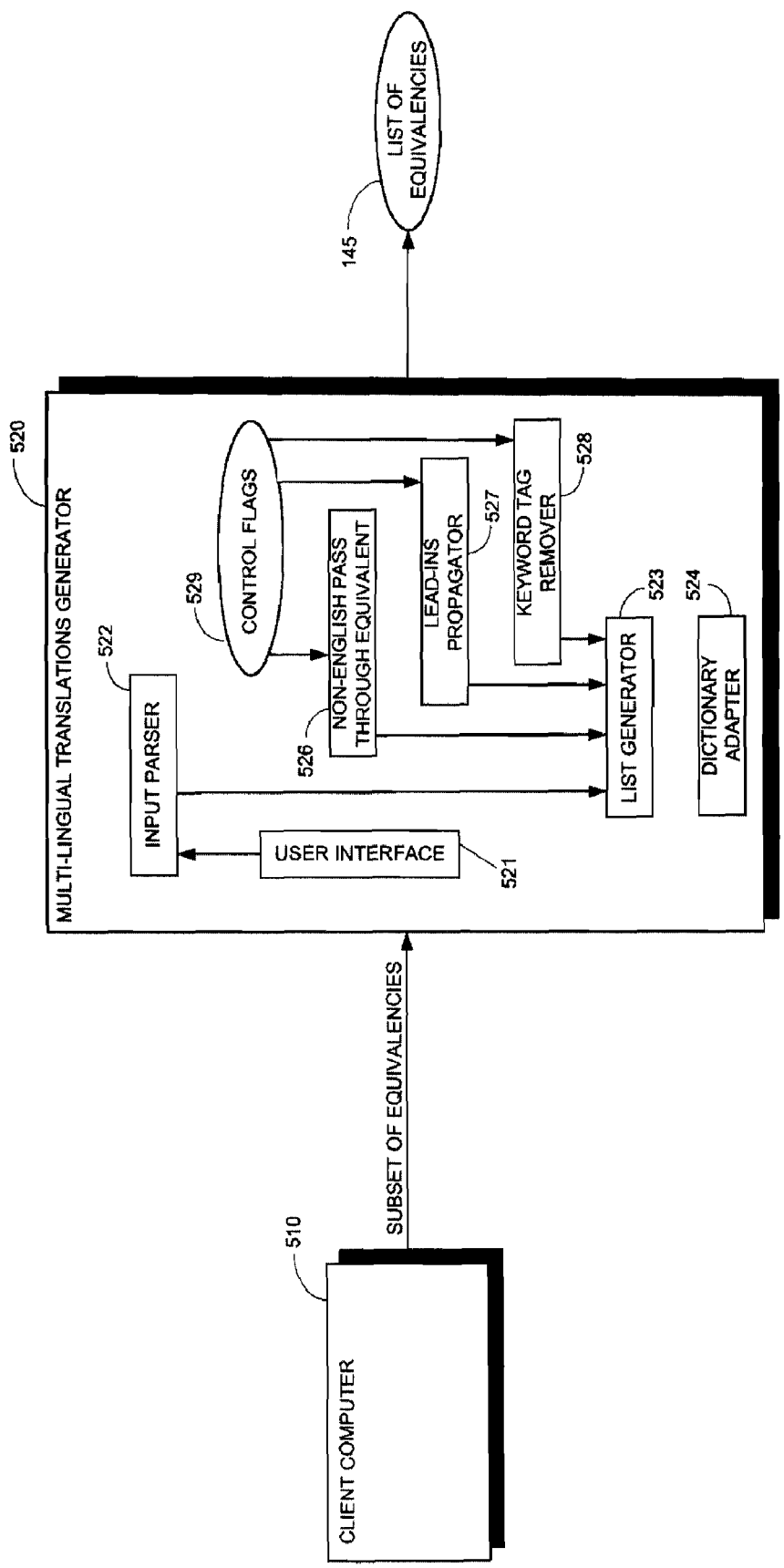
FIG. 5 is a simplified block diagram of a tool for generating a list of equivalencies, including controlled vocabulary terms, free-text terms, or both, in accordance with an embodiment of the present invention.

Reference is now made to FIG. 5, which is a simplified block diagram of a tool for generating a list of equivalencies, including controlled vocabulary terms, free-text terms, or both, in accordance with an embodiment of the present invention. A client computer 510 provides a subset of multi-lingual equivalencies, from which a multi-lingual translations generator 520 populates the complete list of equivalencies 145. Multi-lingual translations generator 520 accepts as input a subset of multi-lingual equivalencies, and produces a full set of equivalencies as output. The multi-lingual equivalencies input to translations generator 520 and the multi-lingual equivalencies output by translations generator 520 are based on translations of an English controlled vocabulary, as well as a number of "control flags" that specify how each equivalency is to be built, as described with reference to FIG. 6.

Figure 6:
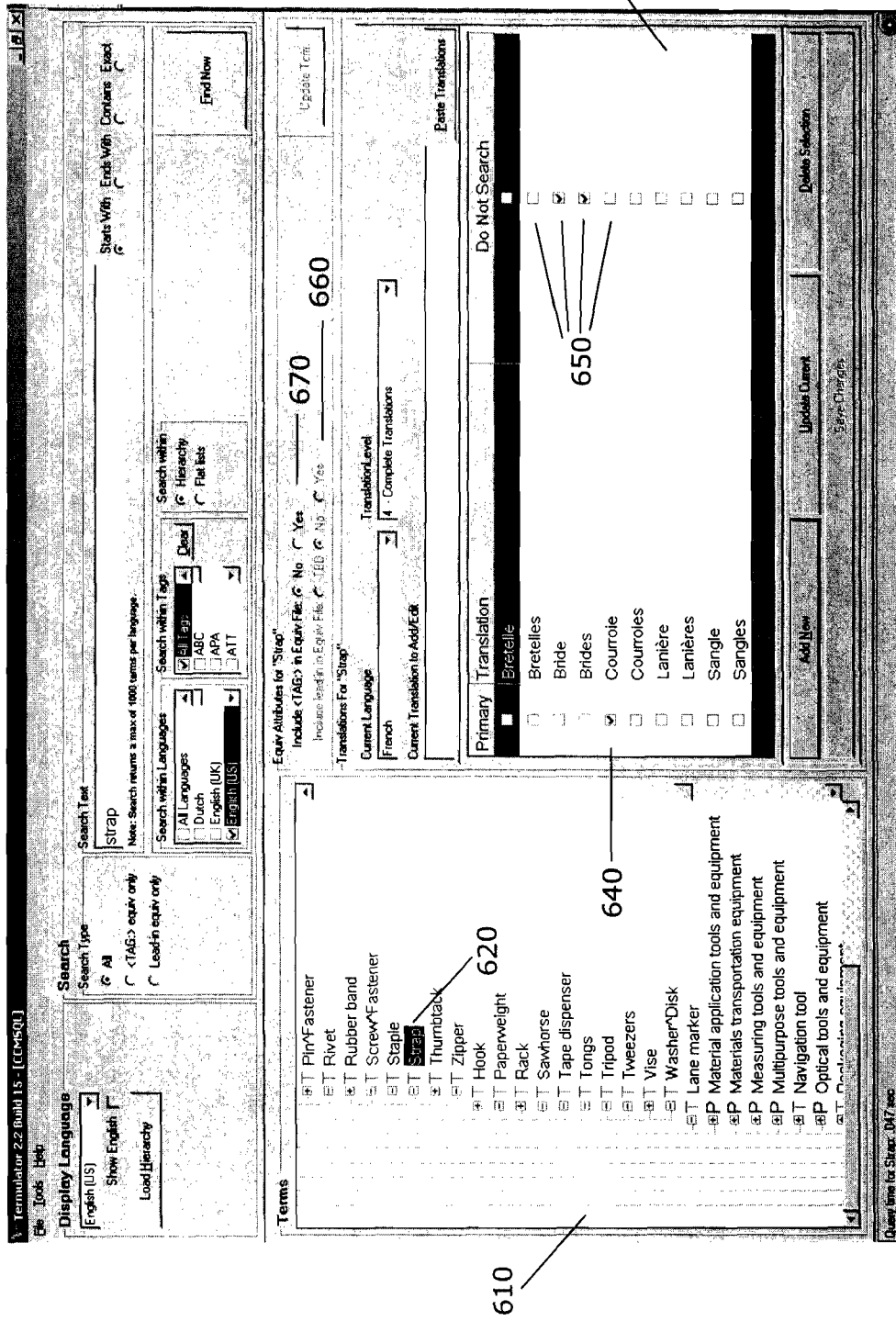
FIG. 6 shows a sample user interface for specifying and managing multi-lingual equivalencies, in accordance with an embodiment of the present invention.

Reference is now made to FIG. 6, which shows a sample user interface for specifying and managing multi-lingual equivalencies, in accordance with an embodiment of the present invention. Shown in FIG. 6 is an application tool named "Termulator", which provides a user interface to the data that is used to generate the list of equivalencies 145 in FIG. 1. The user interface in FIG. 6 enables a vocabulary expert to manually or automatically or partially automatically translate words from an English vocabulary into a non-English language, such as French. A French vocabulary expert selects an English word from the English vocabulary that is displayed in a left pane 610, such as the word "Strap" 620 shown in FIG. 6. The expert then enters one or more French translations in a right pane 630, and sets various control flags described in detail hereinbelow. The French translations shown in FIG. 6 may be entered manually by the expert, or imported from a spreadsheet or other such document created by the expert.

As shown in FIG. 6, there are many French terms that are equivalent to the English term "Strap," and one such French term is designated in checkbox 640 as being the primary translation. The other French terms are secondary translations. The distinction between primary and secondary translations is used to simplify visual displays. Specifically, when a keyword is presented in a given language, the primary translation is the one that is displayed. Otherwise, displaying all of the translation variants to a user may be cumbersome and confusing.

The present invention further provides a capability for a user to import external files including inter alia non-primary language dictionaries, and to create and import user-defined "complex equivalencies" as described in detail hereinbelow with reference to FIG. 8.

Referring back to FIG. 5, client computer 510 interacts with multi-lingual translations generator 520 via a user interface 521, such as the interface illustrated in FIG. 6, for inputting multi-lingual equivalencies in a user-friendly format. Multi-lingual translations generator 520 includes a parser 522, which interprets the user-friendly format and converts the equivalencies into an internal format for further processing. A list generator 523 processes the user input equivalencies to produce the complete list of equivalencies 145, and formats the list as required by translation machine 140. Multi-lingual translations generator 520 also incorporates dictionaries of multi-lingual equivalencies using a dictionary adapter 524, as described with reference to FIG. 7.

Figure 7:
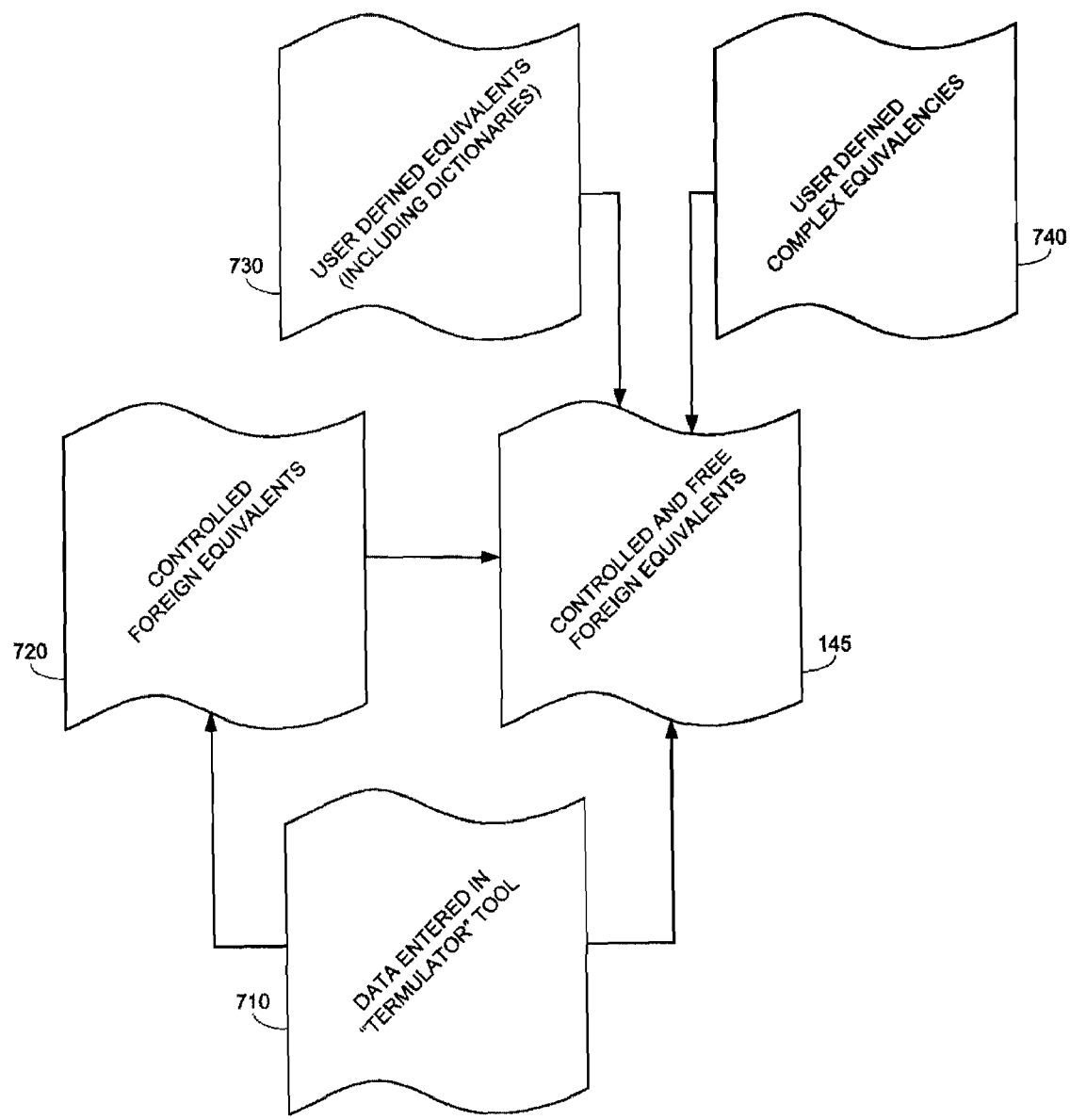
FIG. 7 is a simplified data processing flow diagram indicating various inputs and stages in generating a list of equivalencies, in accordance with an embodiment of the present invention.

Reference is now made to FIG. 7, which is a simplified data processing flow diagram indicating various inputs and stages in generating the list of equivalencies 145, in accordance with an embodiment of the present invention. Data entered via the Termulator user interface illustrated in FIG. 6 is stored as data 710. Data 710 is used to generate a first list of equivalencies 720, whereby foreign words are listed with English equivalents from controlled vocabulary 123. An entry in list 720 may be formatted as dinde=GAN:Turkey where the French word "dinde" is equivalent to the controlled English word GAN:Turkey.

Data 710, controlled equivalency data 720 and one or more external files including user-defined equivalencies 730, are used to generate the list of equivalencies 145, whereby foreign words are listed with English equivalents from controlled vocabulary 123, free-text, or both. Specifically, the list of equivalencies 145 may be additionally populated (i) by adding English lead-in terms to the controlled terms from list 720, (ii) by adding user-defined equivalencies, such as from an external dictionary, and (iii) by adding complex equivalencies, as described with respect to FIG. 8 hereinbelow.

Referring back to FIG. 5, in addition to English equivalencies of non-English terms, multi-lingual translations generator 520 may also include some non-English terms in the list of equivalencies 145, by passing through such terms as if they were English. Some non-English terms may correspond to terms in the English catalogues 123 and 127; such as proper names of people, organizations and places, and foreign words that have been incorporated into the English language. For instance, in a Spanish search for the word "flamenco", the word "flamenco" should be passed through as an English search term, if it is not already stored as an equivalent. On the other hand, some non-English terms may correspond to English terms with different meanings, in which case these non-English terms should not be included as equivalents in list 145. For example, the Spanish word "arena" is equivalent to the English word "sand", and thus multi-lingual translations generator 520 should not include the English word "arena" as an equivalent to the Spanish word "arena". In accordance with the format used by the present invention, an entry arena, sand with comma-separated terms would indicate (incorrectly) that both "arena" and "sand" are equivalents of the Spanish word "arena"; whereas an entry arena=sand with an equals sign indicates (correctly) that only "sand" is an equivalent of the Spanish word "arena".

In accordance with an embodiment of the present invention, non-English terms may be flagged as "Do Not Search". For example, some non-English terms may be obtained from an external dictionary, and a language expert may determine that certain non-English terms should not be associated with certain English terms, to avoid irrelevant search results. Multi-lingual translations generator 520 is instructed not to include such terms as non-English equivalents in the equivalents database 145. Referring back to FIG. 6, a "Do Not Search" checkbox 650 appears alongside each French term, for indicating that such term should or should not be included as a non-English equivalent by multi-lingual translations generator 520. Correspondingly, multi-lingual translations generator 520 includes non-English pass through equivalent 526, which preserves or removes the non-English query term itself, according to the "Do Not Search" flags, when deriving the list of equivalencies 145 from controlled list 720.

As described hereinabove, when synonymous English terms are used to catalogue digital content, one of them is designated as being a Preferred term, and the others are designated as being "lead-in" terms. For example, the English expression "terrorist attack" is a lead-in to the English Preferred term "act of terrorism". It may be appropriate to include lead-ins as equivalencies when the Preferred terms appear in the list of equivalencies 145. For example, the French expression "acte de terrorisme" is equivalent to the English expression "act of terrorism". Since "terrorist attack" is a lead-in to "act of terrorism", it may be appropriate to add an equivalency between the French "acte de terrorisme" and the English "terrorist attack" in list 145; i.e., the entry acte de terrorisme=act of terrorism, terrorist attack may be generated in list 145.

In accordance with an embodiment of the present invention, each English lead-in to a Preferred English term may be flagged as "Include Lead-In in List of Equivalencies". Lead-in terms may be individually accessed for flagging within the Termulator user interface shown in FIG. 6 by searching them directly, and by expanding a "LeadIns" folder. Multi-lingual translations generator 520 includes a lead-ins propagator 527, which populates the list of equivalencies 145 with lead-in equivalencies corresponding to Preferred term equivalencies, according to the status of the "Include Lead-In in List of Equivalencies" flags for each lead-in term. Button 660 from the Termulator interface in FIG. 6 is used to set this flag, for each controlled lead-in term.

As mentioned hereinabove, data in the searchable catalogue may include controlled vocabulary keywords 123 with unique meanings, or free-text 127. When an English term is ambiguous (e.g., Turkey), it is desirable to limit an equivalency to the controlled value only. For non-ambiguous terms, equivalencies should also include free-text values. For example, if translation machine 140 receives as input a Spanish query with the term "caballo", it may include "GAN: horse" (i.e., unique controlled vocabulary term) or "horse" (i.e., free-text), or both, within its English query output.

In accordance with an embodiment of the present invention, controlled vocabulary keywords may be flagged as "Include Tag in Equivalency File". Button 670 from the Termulator interface in FIG. 6 is used to set this flag, for each controlled English vocabulary term. Correspondingly, multi-lingual translations generator 520 includes a keyword tag remover 528, which preserves or removes controlled vocabulary tags according to the "Include Tag in Equivalency File" flags, when deriving the list of equivalencies 145 from controlled list 720. When the "Include Tag in Equivalency File" flag is set to "Yes", the tag of the controlled term in list 720 is preserved in list 145, and the equivalency is thus limited to the unique controlled keyword value. No free-text search for that word is conducted. Otherwise, the tag of the controlled English term in list 720 is removed in list 145.

It will be appreciated by those skilled in the art that the data processing flow illustrated in FIG. 7 is but one possible embodiment of multi-lingual translations generator 520. In another embodiment the list of equivalencies 145 may be generated directly, without first generating the auxiliary controlled list 720.

TABLE I summarizes the various control flags described hereinabove, used by multi-lingual translations generator 520 in generating the list of equivalencies 145, in accordance with an embodiment of the present invention. The control flags in TABLE I are used to automate generation of a complete list of equivalencies 145 from a smaller list provided by a vocabulary expert or imported from an outside source. These sets of control flags are designated as control flags 529 in FIG. 5.

TABLE I

Control flags for query translation

| Flag | Description |
| --- | --- |
| Do Not Search | Do not include the non-English term per se in the translated English query |
| Include Lead-In in List of Equivalencies | Include the lead-in term in the list of equivalencies whenever the associated Preferred term appears in the list. |
| Include Tag in List of Equivalencies | Limit the equivalency to a unique controlled keyword. |

Reference is now made to FIG. 8, which shows a sample user interface for specifying that a non-English term is equivalent to a Boolean expression of English terms, in accordance with an embodiment of the present invention. For example, the German term "winterlandschaft" is equivalent to the Boolean expression (TDS:winter AND PICT:landscape) OR (winter AND landscape), and the German term "bahntunnel" is equivalent to the Boolean expression (tracks OR train) AND tunnel.

It is noted that equivalents can contain references to unique controlled vocabulary terms, such as TDS:Winter, and to general free-text, such as "winter". (In the current embodiment of the invention, TDS is a controlled "tag" that refers to "Time, Day, or Season".) When translation machine 140 encounters such expressions, as those above, in the list of equivalencies 145, it incorporates the Boolean logic into the English query generated by query generator 147. Compound equivalencies, such as those above, may be imported automatically into the list of equivalencies 145 by a user-defined complex expression file 740, as indicated in FIG. 7, or entered by a vocabulary expert.

Figure 9:
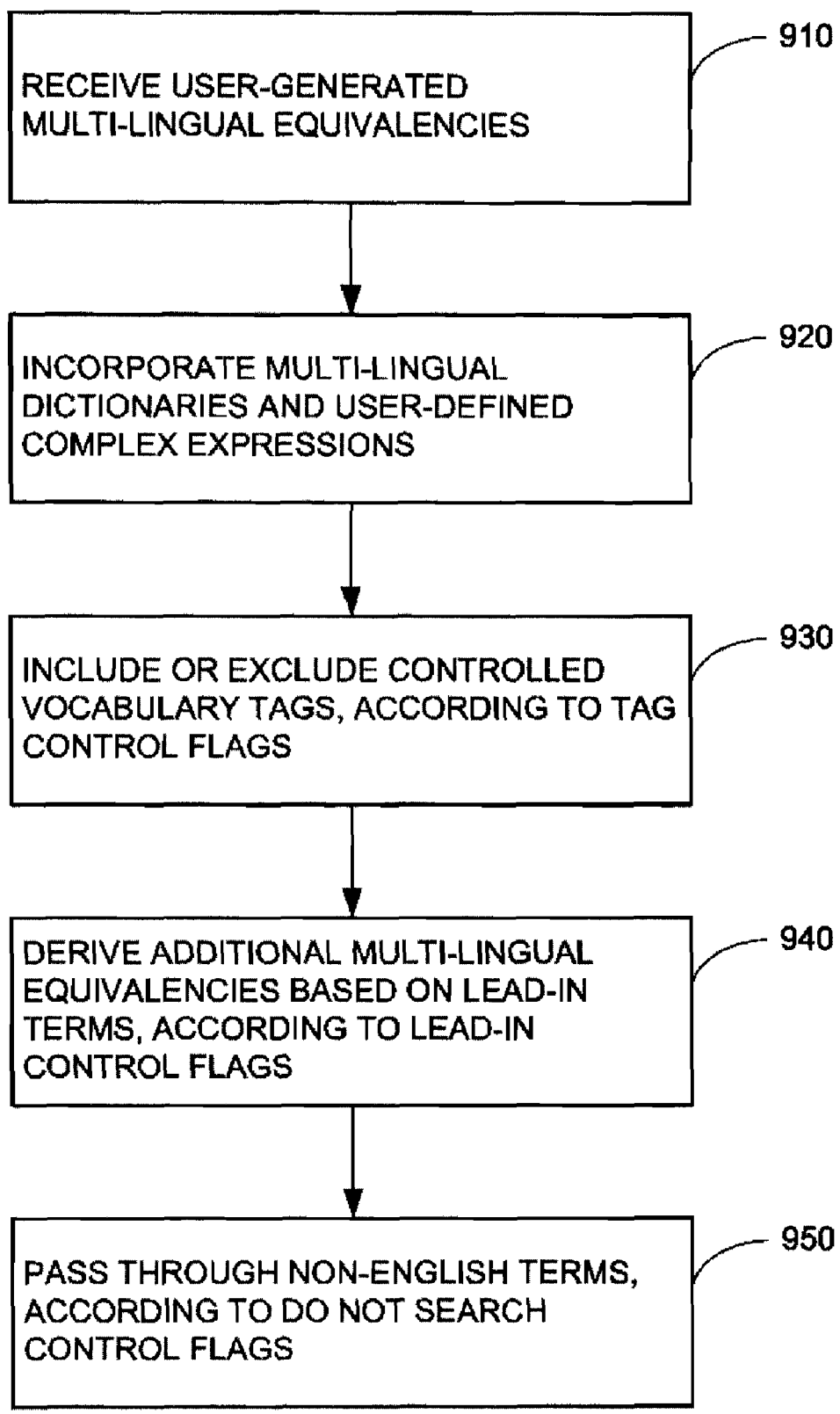
FIG. 9 is a simplified flowchart of a method for generating a list of multi-lingual equivalencies, for use in translating queries from one language to another language, in accordance with an embodiment of the present invention.

Reference is now made to FIG. 9, which is a flowchart of a method used by multi-lingual translations generator 520, for generating a list of multi-lingual equivalencies, for use in translating queries from one language to another language, in accordance with an embodiment of the present invention. At step 910 the translations generator receives as input an initial subset of multi-lingual equivalencies, based on translations of an English controlled vocabulary, so that non-English terms are equated with English controlled vocabulary terms, with English free-text terms, or with both. At step 920 the translations generator accesses and/or incorporates one or more multi-lingual dictionaries or user-defined complex expressions, or both. At step 930 the translations generator preserves or removes context tags for controlled vocabulary keywords, based on the "Include Tag in Equivalency File" control flags. At step 940 the translations generator derives additional equivalencies using lead-in terms, derived from equivalencies that include primary terms, based on the "Include Lead-In in List of Equivalencies" control flags. At step 950 the translations generator passes through non-English terms as equivalents, based on the "Do Not Search" control flags, to generate the list of multi-lingual equivalencies.

Figure 10:
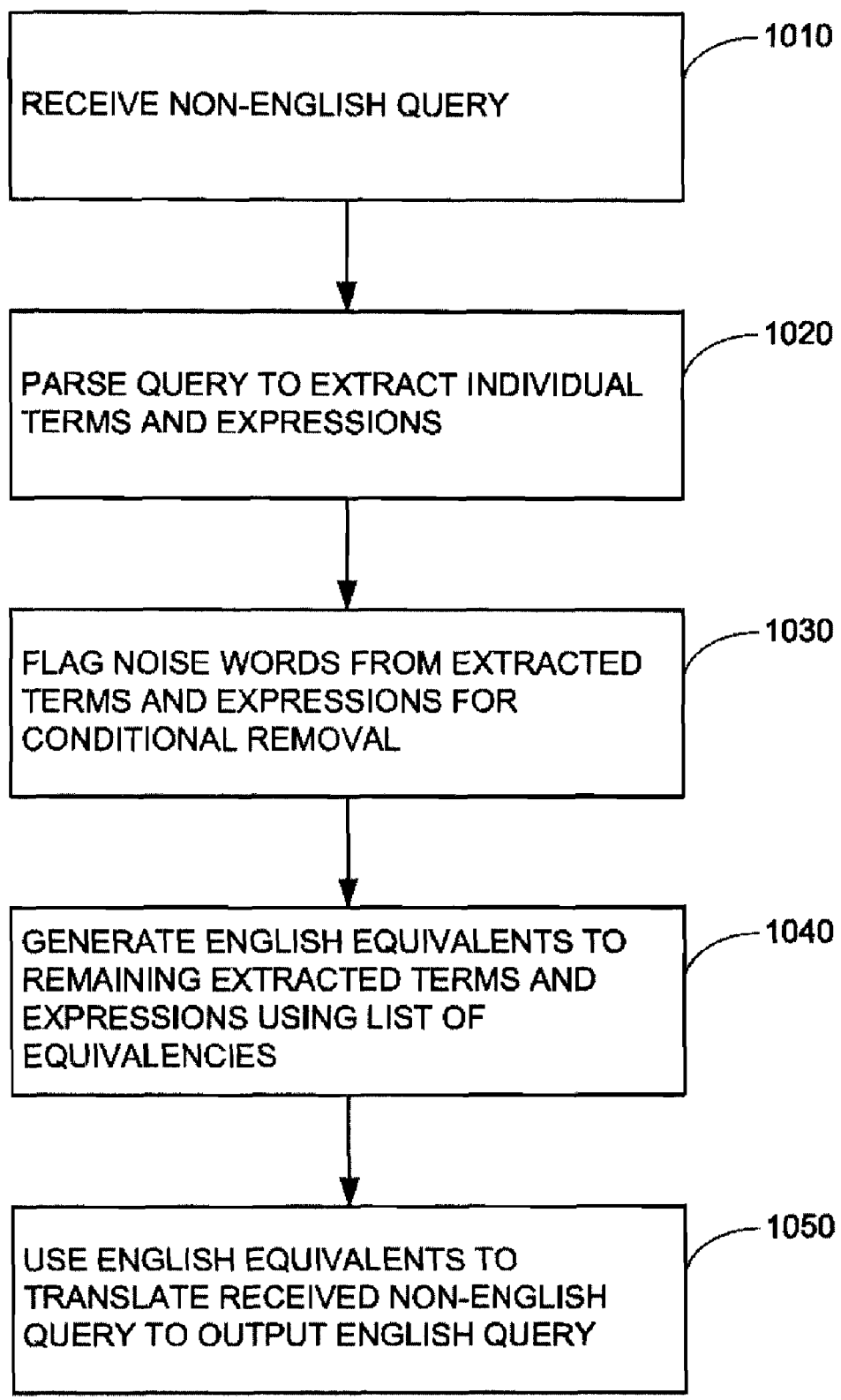
FIG. 10 is a simplified flowchart of a method for translating queries from one language to another language, using controlled vocabulary terms, free-text terms, or both, in accordance with an embodiment of the present invention.

Reference is now made to FIG. 10, which is a flowchart of a method used by translation machine 140 for translating queries from one language to another language, based on stored translation values, stored compound equivalency values, and control flags, in accordance with an embodiment of the present invention. At step 1010 the translation machine receives as input a non-English query. At step 1020 the translation machine parses the non-English query to extract individual terms and expressions therefrom. At step 1030 the translation machine flags noise words from the extracted terms and expressions for conditional removal, as described hereinabove with respect to FIG. 4, using a list of noise words in the appropriate language. At step 1040 the translation machine generates English equivalents for the extracted terms and expressions, using a list of equivalencies. At step 1050 the translation machine uses the English equivalents to create the English output query that is submitted to the English search engine to find content.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed as new and desired to be protected by Letters Patent is:

1. A method for identifying digital content with a client computer, the method enabling operations, comprising:
   generating an equivalency list with a translations generator in communication with the client computer, wherein the list is based on a secondary-language query term associated with at least one primary-language query term, and wherein each of the at least one primary-language query term is in a pre-selected language and the secondary-language term is in a language that is different from the pre-selected primary language;
   receiving the secondary-language query term in a search request for a search engine that is in communication with the client computer;
   selecting the at least one primary-language query term from the equivalency list, based on the received secondary-language query term;
   identifying digital content that is associated with structured text metadata, if the at least one primary-language query term is included in the structured text metadata; and
   identifying digital content that corresponds to unstructured free-text metadata, if the at least one primary-language query term is included in the corresponding unstructured free-text metadata and is not a unique identifier of a defined term in a controlled vocabulary.

2. The method of claim 1, wherein the equivalency list is one of a plurality of equivalency lists, each of which comprises another query term in a language different from that of any other one of the plurality of equivalency lists, and wherein the other query term is associated with the at least one primary-language query term.

3. The method of claim 1, wherein the at least one primary-language query term comprises at least one of the following; a controlled vocabulary keyword, the secondary-language query term, a synonym associated with the secondary-language query term, and a boolean expression of terms in the pre-selected language.

4. The method of claim 1, wherein generating the equivalency list comprises:
   providing an interface enabling a user to associate the at least one primary-language query term with at least one term in the language of the secondary-language term that is different from the pre-selected primary language;
   receiving an indication through the interface that the secondary-language query term is a primary term; and
   receiving an indication through the interface on whether a unique identifier shall be associated with a controlled vocabulary term in the at least one primary-language query term.

5. The method of claim 1, wherein generating the equivalency list comprises determining whether to remove the unique identifier from the at least one primary-language query term.

6. The method of claim 1, wherein the unique identifier indicates a limitation of a meaning of the at least one primary-language query term.

7. The method of claim 1, wherein the structured text metadata comprises at least one keyword from a controlled vocabulary, wherein each of the at least one keyword is identified by a unique identifier associated with a precise concept.

8. The method of claim 1, wherein the corresponding unstructured free-text metadata comprises at least one of the following; a caption, a title, a paragraph, and a date.

9. The method of claim 1, further comprising weighting at least one of the following; the at least one primary-language query term, the structured text metadata, and the corresponding unstructured free-text metadata.

10. The method of claim 1, further comprising prioritizing the identified content based on a weighting of at least one of the following; the at least one primary-language query term, the structured text metadata, and the corresponding unstructured free-text metadata.

11. The method of claim 1, further comprising removing a noise word from the secondary-language query term prior to selecting the at least one primary-language query term from the equivalency list.

12. The method of claim 1, wherein the pre-selected language comprises English.

13. A processor readable non-transitory storage medium that includes a plurality of executable instructions, wherein the execution of the instructions enables operations for performing the steps of claim 1.

14. A system for identifying digital content with a client computer, comprising:
a translations generator that is in communication with the client computer, the translations generator is arranged to perform a plurality of operations including:
generating an equivalency list based on a secondary-language query term associated with at least one primary-language query term, wherein each of the at least one primary-language query term is in a pre-selected language and the secondary-language term is in a language that is different from the pre-selected primary language;
a translating machine that is in communication with the client computer, the translations generator, and a search engine, the translating machine is arranged to perform a plurality of operations including:
receiving the secondary-language query term in a search request for the search engine; and
selecting the at least one primary-language query term from the equivalency list, based on the secondary-language query term; and
the search engine that performs a plurality of operations, including:
identifying digital content that is associated with structured text metadata, if the at least one primary-language query term is included in the structured text metadata; and
identifying digital content that corresponds to unstructured free-text metadata, if the at least one primary-language query term is included in the corresponding unstructured free-text metadata and is not a unique identifier of a defined term in a controlled vocabulary.

15. The system of claim 14, wherein the translations generator is further arranged to perform a plurality of operations, including:
providing an interface enabling a user to associate the at least one primary-language query term with at least one term in the language of the secondary-language term that is different from the pre-selected primary language;
receiving an indication through the interface that the secondary-language query term is a primary term; and
receiving an indication through the interface on whether a unique identifier shall be associated with a controlled vocabulary term in the at least one primary-language query term.

16. The system of claim 14, wherein the search engine further performs the operation of prioritizing the identified content based on a weighting of at least one of the following: the at least one primary-language query term, the structured text metadata, and the corresponding unstructured free-text metadata.

17. A method for associating terms in an equivalency list for identifying digital content with a client computer in communication with a translations generator, the translations generator is arranged to perform a plurality of operations; comprising:

associating a secondary-language term with a controlled vocabulary keyword in a primary-language, if the secondary-language term has a unique meaning depending on a context;
indicating that the secondary-language term exists in the primary language, if the secondary-language term is identical in the primary language;
associating the secondary-language term with a synonym in the primary language, if the secondary-language term is synonymous with the synonym;
designating the secondary-language term as a primary translation based on a primary-language term; and
associating the secondary-language term with a Boolean expression, if a meaning of the secondary-language term can be expressed by a combination of primary-language terms.

18. The method of claim 17, wherein the controlled vocabulary keyword includes a unique identifier indicating that the controlled vocabulary keyword has a meaning depending on the context.

19. The method of claim 17, further comprising at least one of the following:
identifying digital content associated with the secondary-language term based on structured text metadata that is associated with the controlled vocabulary keyword; and
identifying digital content associated with the secondary-language term based on corresponding unstructured free-text metadata that is associated with at least one of the following: the secondary-language term that is identical in the primary language, the synonym in the primary language; and the Boolean expression.

20. A method for generating a list for identifying digital content with a client computer in communication with a translations generator, the translations generator is arranged to perform a plurality of operations, comprising:
receiving a subset of equivalencies comprising a plurality of secondary-language terms that are associated with a primary-language term;
parsing the subset into a list of equivalencies, wherein each equivalency comprises an association of at least one of the plurality of secondary-language terms with the primary-language term;
associating a unique identifier with the primary-language term in at least one equivalency of the list, if at least one of the plurality of secondary-language terms has a limited meaning that is associated with the unique identifier;
adding at least one of the secondary-language terms to at least one equivalency in the list, if the primary-language term is identical to the at least one secondary-language term, wherein the at least one secondary-language term is one of the plurality of secondary-language terms;
adding a primary-language lead-in term to at least one equivalency in the list, if at least one of the plurality of secondary-language terms is synonymous with the primary-language lead-in term;
designating one of the plurality of secondary-language terms as a primary translation based on the primary-language term; and
adding a Boolean expression to at least one equivalency in the list, if the least one of the plurality of secondary-language terms is associated with a combination of terms in the primary language.

21. The method of claim 20, wherein the subset of equivalencies is received from an interface that enables, a user to designate associations between the plurality of secondary-language terms and the primary-language term.

22. The method of claim 20, further comprising providing the list of equivalencies to a search engine that identifies digital content based on the list and at least one of the following; structured text metadata and corresponding unstructured free-text metadata.

23. A system for generating a list for identifying digital content with a client computer, comprising:
 a parser that is in communication with the client computer, the parser is arranged to perform a plurality of operations, including:
  receiving a subset of equivalencies comprising a plurality of secondary-language terms that are associated with a primary-language term; and
  parsing the subset into a list of equivalencies based on each equivalency comprising an association of at least one of the plurality of secondary-language terms with the primary-language term; and
 a list generator that is in communication with the client computer and the parser, the list generator is arranged to perform a plurality of operations, including:
  associating a unique identifier with the primary-language term in at least one equivalency of the list, if at least one of the plurality of secondary-language terms has a limited meaning that is associated with the unique identifier;
  adding a nonprimary-language term to at least one equivalency in the list, if the primary-language term is identical to the nonprimary-language term, wherein the nonprimary-language term is one of the plurality of secondary-language terms;
  adding a primary-language lead-in term to at least one equivalency in the list, if at least one of the plurality of secondary-language terms is synonymous with the primary-language lead-in term;
  designating one of the plurality of secondary-language terms as a primary translation based on the primary-language term; and
  adding a Boolean expression to at least one equivalency in the list, if the least one of the plurality of secondary-language terms is associated with a combination of terms in the primary language.

24. The system of claim 23 wherein the list generator further performs the operation of providing the list of equivalencies to a search engine that identifies digital content based on the list and at least one of the following: structured text metadata and corresponding unstructured free-text metadata.

25. A method for determining a query to identify digital content with a client computer, the method enabling operations, comprising:
 receiving a first equivalency between:
  a primary-language query term in a primary language; and
  a user-specified secondary-language query term in a secondary language;
 receiving a second equivalency between the primary-language query term and an alternate secondary-language query term in the secondary language;
 determining whether to apply a unique identifier to either of the user-specified secondary-language query term or the alternate secondary-language query term with a translations generator in communication with the client computer, wherein the unique identifier refines the meaning of a query term and indicates a structured query term;
 designating a primary translation as one of the user-specified secondary-language query term and the alternate secondary-language query term based on the primary-language query term;
 receiving a search query in the secondary language; and
 determining the primary-language query term with a translating machine in communication with the client computer and the translations generator, wherein the determination is based at least in part on the search query, the user-specified secondary-language query term, and the alternate secondary-language query term.

26. The method of claim 25, wherein the primary language is English and the secondary language is one of a plurality of languages other than English.

27. The method of claim 25, wherein the alternate secondary language query term comprises at least one of the following; a dictionary entry, a user-defined Boolean expression, and a synonym.

28. The method of claim 25, further comprising providing the primary-language query term to a search engine for searching at least one of the following:
 structured text metadata, which comprises a controlled vocabulary of keywords associated with content; and
 corresponding unstructured free-text metadata, which comprises categories of text that need not conform to a controlled vocabulary.

29. The method of claim 25, further comprising removing a noise word from at least one of the following; the user-specified secondary-language query term and the alternate secondary-language query term.

* * * * *